United States Patent [19]

Nishise et al.

[11] Patent Number: 4,906,104

[45] Date of Patent: Mar. 6, 1990

[54] AGITATING AND SUPPLYING DEVICE AND A MOLD FOR MOLDING SAME

[75] Inventors: Hideya Nishise, Osaka; Nobuyuki Mabuchi, Shinshiro; Masao Shimizu, Osaka, all of Japan

[73] Assignee: Minolta Camera Kabushiki Kaisha, Osaka, Japan

[21] Appl. No.: 163,111

[22] Filed: Mar. 2, 1988

[30] Foreign Application Priority Data

Mar. 3, 1987 [JP] Japan .................. 62-48226
Mar. 3, 1987 [JP] Japan .................. 62-48227
Mar. 3, 1987 [JP] Japan .................. 62-48228
Mar. 3, 1987 [JP] Japan .................. 62-48229

[51] Int. Cl.$^4$ .................. B01F 7/08; G03G 15/08
[52] U.S. Cl. .................. 366/319; 366/322; 366/324; 366/156; 355/253; 118/653
[58] Field of Search ............... 366/342, 343, 319, 322, 366/244, 245, 246, 291, 299, 309, 310, 312, 313, 325, 300, 329, 324, 295, 81, 291, 156, 320, 82; 118/653, 656, 612; 222/DIG. 1; 355/3 DD, 253, 245, 259; 198/537, 676, 677, 658, 664, 666, 671

[56] References Cited

U.S. PATENT DOCUMENTS

| 1,036,374 | 8/1912 | Temple | 366/310 |
| 2,289,613 | 7/1942 | Weinreich | 366/246 |
| 2,506,101 | 5/1950 | Oltz | 366/309 |
| 2,526,367 | 10/1950 | Kaltenbach et al. | 366/313 |
| 2,645,911 | 7/1953 | Martin | 366/319 |
| 3,279,894 | 10/1966 | Tate et al. | 366/322 |
| 3,380,716 | 4/1968 | Arter | 366/313 |
| 3,918,399 | 11/1975 | Fox et al. | 118/612 |
| 4,235,194 | 11/1980 | Wada et al. | |
| 4,241,590 | 12/1980 | Martineau | 366/320 |
| 4,477,173 | 10/1984 | Kozuka et al. | 355/3 DD |
| 4,506,990 | 3/1985 | Neier et al. | 366/322 |
| 4,711,551 | 12/1987 | Fujio et al. | 118/653 |
| 4,721,982 | 1/1988 | Ueda | 355/253 |
| 4,768,055 | 8/1988 | Takamatsu et al. | 355/3 DD |
| 4,784,081 | 11/1988 | Knott | 366/319 |

FOREIGN PATENT DOCUMENTS 61-14849 4/1986 Japan .

Primary Examiner—Harvey C. Hornsby
Assistant Examiner—Joseph S. Machuga
Attorney, Agent, or Firm—Wenderoth, Lind & Ponack

[57] ABSTRACT

An agitating and supplying device arranged in a powder developer cyclic path of a developing apparatus comprises a pairs of flanges, a plurality of first supplying members and a plurality of second supplying members, all supplying members being arranged between both of the flanges. By rotation of the agitating and supplying device, a developer is transferred while being agitated in the axial direction and the centrifugal direction thereof and supplied on the surface of a magnet sleeve roller.

A mold for molding the agitating and supplying device, comprises a plurality of mold members opening in the radial direction with respect to the axis of the device, the number of said member being the same as those of the first supplying members. The flanges, the first supplying members, and parts of the second supplying members of the agitating and supplying device are molded integrally by the mold.

8 Claims, 11 Drawing Sheets

AGITATING AND SUPPLYING DEVICE AND A MOLD FOR MOLDING SAME

BACKGROUND OF THE INVENTION

The invention relates to an agitating and supplying device. More particularly, the invention relates to the agitating and supplying device, arranged in a powder developer cyclic path of a developing apparatus, for transferring a developer while agitating it and supplying it on the surface of a magnet sleeve roller and to a mold for molding such a device.

Conventionally, there has been proposed, for example, in U.S. Pat. No. 4,235,194, a developing apparatus in which an agitating and transferring device for transferring and agitating a developer is arranged. The apparatus has a plurality of buckets, fitted in confronting flanges parallel to a rotary shaft, for supplying a developer on the surface of a developing roller, and blades for transferring the developer in its axial direction, arranged at a given space in the inner bottom of each bucket.

In this agitating and transferring device, since each bucket and each blade are screwed therein, the assembly manday and the production cost of the device greatly increase. Further, since the both ends of each bucket of the device are only fitted in the flanges to support, in the rotation of the device, the phenomenon that the buckets bend outwardly by the centrifugal force acting on the buckets and contact the housing of the developing apparatus causes a noise problem.

Meanwhile, there has been proposed, for example, Japanese Patent Application No. 61-14849, the technology which assembles molded-parts into a transferring and agitating device. This device has a plurality of blades for transferring a developing in its axial direction, fitted on a rotary shaft. The assembly manday of the device decreases as compared with the previous agitating and transferring device. However, this device has some problems. One of the problems is that, since the device can not be molded by one mold, the production cost thereof increases. The other problems is that, since the intensity of the device itself only depends on the rotary shaft, the higher intensity of the rotary shaft is required.

SUMMARY OF THE INVENTION

Accordingly, an essential object of the present invention is to provide an agitating and supplying device in which the assembly manday and the production cost of the device greatly decrease.

Another important object of the present invention is to provide an agitating and supplying device preventing from transforming by force acting thereon and from making a noise thereby.

A further important object of the present invention is to provide a mold for molding the agitating and supplying device integrally in which the assembly manday and the production cost of the device greatly decrease.

In accomplishing these objects, according to one preferred embodiment of the present invention, the agitating and supplying device comprising a pair of flanges, a plurality of first supplying members, and a plurality of second supplying members. The agitating and supplying device is mounted rotatably round a fictitious rotary center axis in a developing apparatus, transfers a developer in the rotary center axial direction thereof while agitating it by rotation thereof and supplies the developer on a developer roller. The pair of the flanges are mounted rotatably round the axis on the apparatus to face to each other at a specified interval therebetween. The plural first supplying members supply the developer on the surface of the developer roller. The one end of each first supplying member is connected with the circumferential portion of one of the flanges, and the other end of each first supplying member is connected with the circumferential portion of the other flanges. The plural second supplying members transfer the developer in the axial direction. Each second supplying member has a transfer surface inclined toward the axial direction. One end of the transfer surface is connected with one of the adjacent first supplying members and the other end of the transfer surface is connected with the other of the adjacent first supplying members.

In this embodiment, the agitating and supplying device is driven through the flanges to rotate round the center axis. By this rotation, each first supplying member and each second supplying member are rotated round the axis. Each first supplying member transfers the developer in the centrifugal direction by the forward face thereof. Each second supplying member transfers the developer in the axial direction and the circumferential direction by the inclined transfer surface thereof. Thus, the developer is agitated and transferred in the axial direction and the centrifugal direction.

By the above arrangement of the present invention, the plural first supplying members arranged approximately parallel to the axial direction receive the force acting thereon approximately perpendicular to the axial direction. Then, the agitating and supplying device can receive the force producing by rotation for agitating the developer. That is, the force acting on the agitating and supplying device is separated two components; one is received by the first supplying members, and the other is received by the second supplying members. Therefore, since, without a center shaft, the agitating and supplying device can receive the force acting thereon, the agitating and supplying device can be prevented from transforming by the force and from making a noise thereby, as much as possible.

In another preferred embodiment of the present invention, the plural second supplying members are connected with each other to form rings like a spiral. By the arrangement, the efficiency of the transferring of the developer in the axial direction can be improved. Also, the second supplying members themselves, connected with each other to form endless rings, like a spiral, arranged in the circumferential direction, can receive the centrifugal force thereof which is produced by rotation of the agitating and supplying device.

In another preferred embodiment of the present invention, each first supplying member is comprised of a diametral member and a circumferential member. Each diametral member is molded integrally with the flanges and the second supplying members, and has a transfer surface approximately parallel to the radial direction with respect to the center axis. Each of the circumferential member is held removably at the circumferential ends of the second supplying members and has a transfer surface approximately parallel to the tangent of the circumferential direction with respect to the center axis.

By the arrangement of the embodiment, the transfer surface, approximately parallel to the radial direction, of the diametral member and the transfer surface, approximately parallel to the tangent of the circumferential direction, of the circumferential member form a transfer space for transferring the developer. Then, when the agitating and supplying device is rotated, the developer is held in the transfer spaces to be transferred in the radial direction. Therefore, the efficiency of transferring of the developer in the radial direction can be improved.

In another preferred embodiment of the present invention, each second supplying member has a groove for holding removably the circumferential member at the circumferential end thereof, the bottom of each groove being wider than the opening thereof as a dovetail groove.

By the arrangement, each circumferential member can be engaged simply and held fixedly in the groove.

In another preferred embodiment of the present invention, each flange has engaging holes for engaging with each end of the circumferential member at the confronting face of the flange. Both ends of each circumferential member are engaged with each hole respectively.

By the arrangement, when each circumferential member positions on the other members, the positioning thereof can be simplified.

In another preferred embodiment of the present invention, a mold for molding the agitating and supplying device comprising a plurality of mold members for opening in a radial direction with respect to the axial direction thereof. The number of the mold members is the same as those of the first supplying members.

By the above arrangement, since the agitating and supplying device is a molding molded integrally, the whole is almost comprised of a single piece. Thus, the assembly manday is greatly simplified and the production cost of the device greatly decreases.

The term "molded integrally" used herein is intended to integrate the flanges, the first supplying members and the second supplying members into a single molding. Each of the first supplying members transfers the developer in the centrifugal direction with respect to the axial direction thereof and supports the second supplying members.

In another preferred embodiment of the present invention, each flange has a center hole. A center shaft separated from said agitating and supplying device is inserted into the center holes thereof to connect with said second supplying members.

By the arrangement of the embodiment, the agitating and supplying device makes the center end faces of the second supplying members connect the center shaft to remedy a strain or a bend mainly in the axial direction. Thus, the agitating and supplying device can prevent from producing the strain or the bend thereof so as to transfer stably the developer while agitating it.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
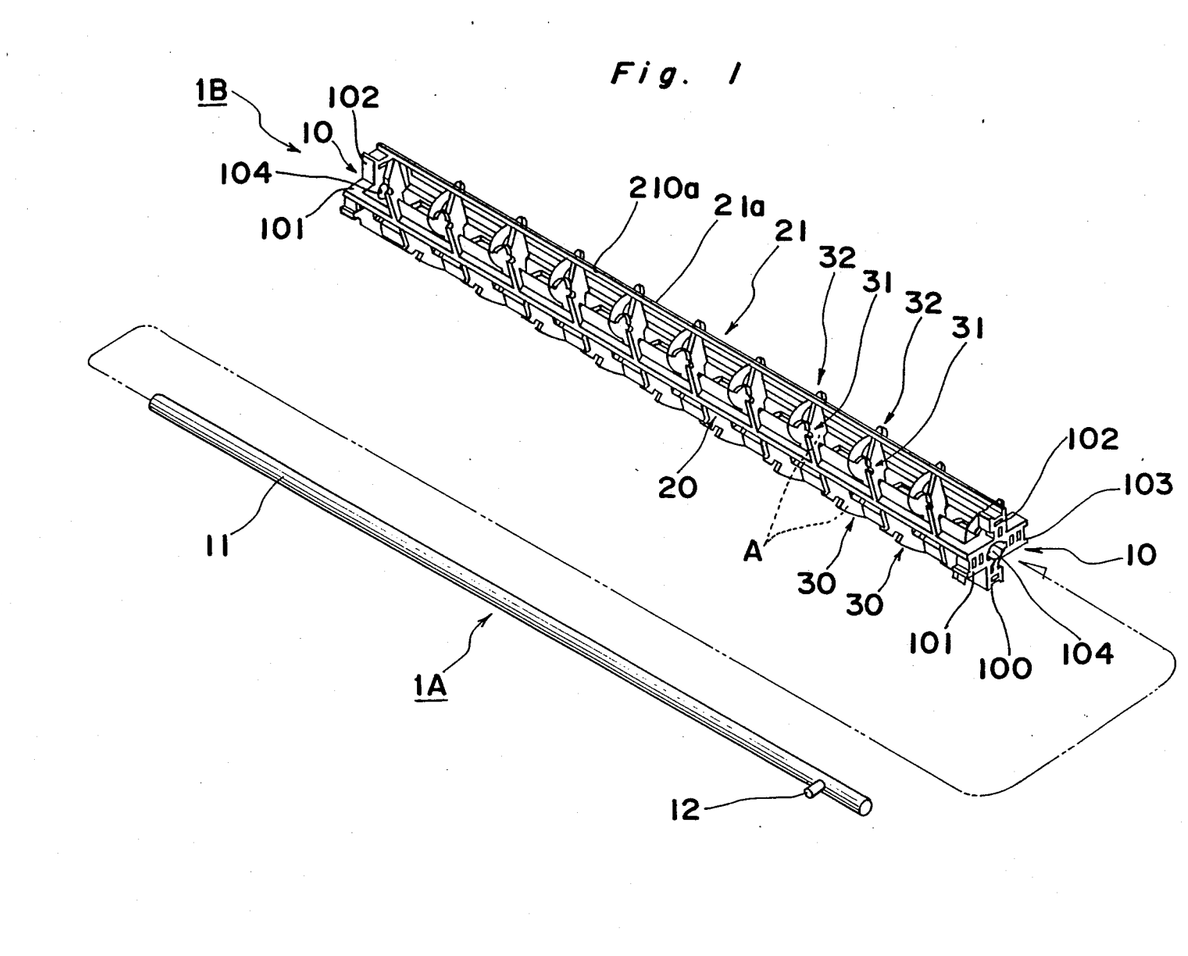
FIG. 1 is a perspective view showing an agitating and supplying device according to one preferred embodiment of the present invention.

Referring now to the drawings, an agitating and supplying device 1B according to this embodiment is mounted rotatably round a rotary center axis in a developing apparatus so as to transfer a developer in the rotary center axial direction thereof while agitating the developer by rotation thereof and to supply the developer on the surface of a developer roller. The agitating and supplying device comprises an integral molded piece made of synthetic resin by molding, as shown in FIG. 1.

Into the agitating and supplying device 1B, a center shaft 1A is inserted. The center shaft 1A is a shape of a circular cylinder. The shaft 1A is made of material, preferably such as metal or rigid resin, having a specified rigidity. The longitudinal measure of the outer circumferential surface 11 of the shaft 1A is accurate within a specified range. An engaging pin 12 is projected from the one end of the surface of the shaft 1A.

The shaft 1A is a center axis of rotation of the agitating and supplying device.

The agitating and supplying device 1B comprises a pair of cross-shaped flanges 10, 10, four centrifugal transfer portions 20, 21, 22, 23 serving as the first supplying member, and a plurality of axial transfer portions 30, 31, 32, 33 serving as the second supplying member.

The pair of flanges are mounted rotatably round the axis on the apparatus to face to each other at a specified interval therebetween. The plural centrifugal transfer portions supply the developer on the surface of the developer roller. The plural axial transfer portions transfer the developer in the axial direction.

The both flanges 10, 10 are arranged at the both ends of the agitating and supplying device 1B. Each flange 10 has a center hole 104 at the center portion thereof. The hole 104 has a channel for inserting the center shaft 1A, having the engaging pin 12, into to hold it at each of both sides thereof, respectively. The engaging pin 12 can be inserted into this channel. Each flange 10 has four peripheral edges 100, 101, 102, 103 extending outwardly from the center thereof along the diametral direction thereof which is formed at a specified intervals along the circumferential direction thereof.

Figure 2:
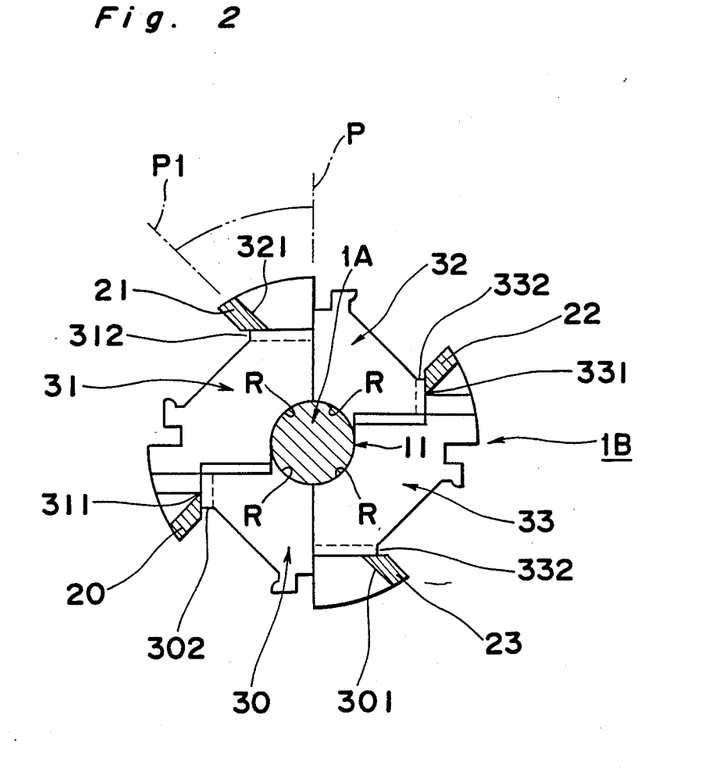
FIG. 2 is a transverse sectional view showing the agitating and supplying device of FIG. 1.

Each of the centrifugal transfer portions 20, 21, 22, 23 is a long plate having a specified width in the diametral direction of the center axis. The both ends of the centrifugal transfer portions 20, 21, 22, 23 are connected integrally with the corresponding peripheral edges 100, 101, 102, 103 of the pair of flanges 10, 10 so that each portion 20, 21, 22, 23 is arranged parallel to the center axis. As shown in FIG. 2, each centrifugal transfer portion is positioned at a specified position P1 shifted, along the circumferential direction thereof, from a straight line P extending from the center portions of the flanges 10, 10 in the diametral direction. The centrifugal transfer portions 20, 21, 22, 23 are arranged to be symmetric with respect to the center axis thereof at each other respectively.

Figure 3:
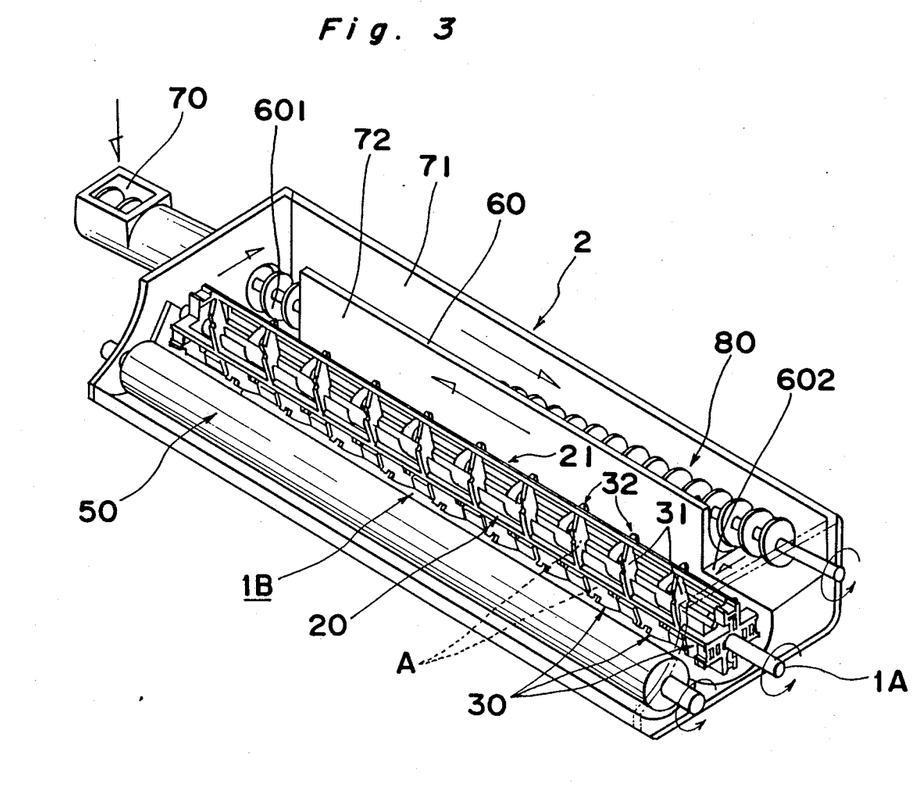
FIG. 3 is a perspective view showing a developing apparatus 2 having the agitating and supplying device 1B of FIG. 1, which is inserted a center shaft 1A into the center portion thereof and which is mounted into a second developer storage tank 72 of the apparatus 2.

As shown in FIG. 1 and 3, each of the axial transfer portions 30, 31, 32, 33 is arranged between the adjacent two centrifugal transfer portions. Each axial transfer portion 30, 31, 32, 33 has a fan-shaped cross-section having a center angle of 90°, and has a slant transfer surface A, extending in the circumferential direction, inclined towards the center axis of the agitating and supplying device 1B. The agitating and supplying device 1B has each ten axial transfer portions 30, 31, 32, 33 so as to be arranged ten slant transfer surfaces A at a specified intervals along the axis. As shown in FIG. 2, each of the axial transfer portions 30, 31, 32, 33 has a circular-arc-shaped central end face R as contact surface contacting the outer circumferential surface 11 of the center shaft 1A, at the center portion thereof. As shown in FIG. 2, in each of the axial transfer portions 30, 31, 32, 33, the both ends 301 and 302, 311 and 312, 321 and 322, 331 and 332 thereof are connected with two corresponding centrifugal transfer portions 23 and 20, 20 and 21, 21 and 22, 22 and 23 adjacent to each other in the circumferential direction, respectively. Thus, each of the four axial transfer portions 30, 31, 32, 33 is located each 90° apart, that is, located respectively at 0°–90°, 90°–180°, 180°–270°, 270°–360°, and spaced approximately equally, so as to form endless rings. Each axial transfer portion is connected through the connecting portion, where the centrifugal transfer portion is connected with the axial transfer portion, with the centrifugal transfer portion, so as to form ring-shapes. The axial transfer portions 30 and 32 located 180° apart are approximately symmetric with respect to the axis. The axial transfer portions 31 and 33 located 180° apart are approximately symmetric with respect to the axis. The axial transfer portions form a group of spiral from the approximately continuously adjacent axial transfer portions in the circumferential direction extending from one end of the slant transfer surfaces A to other end thereof. Thus, as a whole, two groups of spirals are formed thereby. That is, four axial transfer portions 30, 31, 32, 33 extend along the axial direction while they rotate five times round the center axis along the circumferential direction, thus by these extension and rotation, the two groups of spirals are formed. If the device comprises two first supplying members, each second supplying member can have a semicircle shape cross-section lacked the center portion therefrom. If the device comprises three first supplying members, each second supplying member can have a fan-shape cross-section having center angle of 120° which is lacked the center portion therefrom.

The agitating and supplying device according to the preferred embodiment of the present invention is comprised of the above components.

The operation of the agitating and supplying device assembled in the developing apparatus 2 is described hereinafter.

The center shaft 1A is inserted into the center hole 104 of the agitating and supplying device 1B. The central end faces of the axial transfer portions 30, 31, 32, 33 contact the outer circumferential surface 11 of the shaft 1A so as to maintain the portions at a regular positions to remedy the strains of the portions. The engaging pin 12 of the center shaft 1A is engaged with the corner portion formed between one of the flanges 10 and the axial transfer portion connected with this flange 10 at the one end thereof. Thus, the rotation of the center shaft 1A can be transmitted to the agitating and supplying device 1B. This agitating and supplying device 1B is located in the second developer storage tank 72 of the developing apparatus 2 shown in FIG. 3. The apparatus 2 comprises a first developer storage tank 71, the second developer storage tank 72, a toner supply opening 70 for supplying a toner from a toner bottle (not shown) to the first developer storage tank 71, a transfer screw member 80, located in the first developer storage tank 71, for transferring the toner and a developer in the center axial direction while agitating them, and the agitating and supplying device located in the second developer storage tank 72. The space in the developing apparatus 2 is separated along a longitudinal direction by a partition 60 having a first cutout 601 and a second cutout 602 at the ends thereof so as to form the first developer storage tank 71 and the second developer storage tank 72, respectively. The both tank 71 and 72 are communicated with each other through the first cutout 601 and the second cutout 602 at the ends thereof. The agitating and supplying device transfers the developer, transferred from the first developer storage tank 71, along the circumferential direction while transferring along an axis and agitating it, and supplies it on the surface of a magnet sleeve roller 50. A center shaft portion can be molded integrally at each center portion of the axial transfer portion, so as to connected integrally the center shaft portion with the center portions thereof, according to use purposes.

Next, the operation of the agitating and supplying device 1B and the developing apparatus 2 is described hereinafter.

The developer in the first developer storage tank 71 is transferred therefrom through the second cutout 602 of the partition 60 to the second developer storage tank 72 by the screw member 80. Then, the agitating and supplying device 1B rotating with the center shaft 1A in the direction shown by the arrow transfers the developer in the second developer storage tank 72 along the axial direction while agitating it as the agitating and supplying device 1B transfers it in the centrifugal direction. In this process, the developer in the second developer storage tank 72 is transferred along the centrifugal direction by rotation of each centrifugal transfer portion 20, 21, 22, 23 so as to be supplied on the surface of the magnet sleeve roller 50. The developer in the second developer storage tank 72 is transferred along the axial frontward direction leftward in FIG. 3 while be agitated the developer, by the slant transfer surfaces A of the axial transfer portions 30, 31, 32, 33 rotating in the same direction with the centrifugal transfer portion 20, 21, 22, 23.

The some of the developer supplied on the surface of the magnet sleeve roller 50 by rotation of the agitating and supplying device 1B develops an electrostatic latent image of a photosensitive member (not shown), and the rest thereof is withdrawn in the second developer storage tank 72. The withdrawn developer is resupplied on the surface of the magnet sleeve roller 50 with a toner agitating into the developer, by the centrifugal transfer portions 20, 21, 22, 23 and the plural axial transfer portions 30, 31, 32, 33. By repeat of these process, the developer is transferred in the direction from the right to the left shown in FIG. 3 with the concentration of the toner decreasing so as to withdraw from the second developer storage tank 72 through the first cutout 601 of the partition 60 to the first developer storage tank 71. According to a designation generated from a toner concentration detecting device (not shown), the toner supplied from the toner supply device (not shown) to the toner supply opening 70 and the developer withdrawn in the first developer storage tank 71 are transferred in the longitudinal frontward direction rightward shown in FIG. 3 while being mixed and agitated by the transfer screw member 80. Thus, the developer is circulated through the first developer storage tank 71 and the second developer storage tank 72. In this circulating process, the developer is supplied to the developer consumption portion by the agitating and supplying device 1B.

As is seen from the above description, according to the agitating and supplying device of the first embodiment, the agitating and supplying device 1B is an integral molded piece comprising the one pair of flanges 10, 10, the four centrifugal transfer portions 20, 21, 22, 23 and the plural axial transfer portions 30, 31, 32, 33. Thus, since the both ends 301 and 302, 311 and 312, 321 and 322, 331 and 332 of the axial transfer portions 30, 31, 32, 33 met with the highest resistance when the developer is transferred while agitated, are connected with the centrifugal transfer portions 20, 21, 22, 23 respectively so as to reinforce the axial transfer portions 30, 31, 32, 33, there can be an improvement in the rigidity of the device. That is, the force acting on the agitating and supplying device is separated two components; one is received by the centrifugal transfer portions, and the other is received by the axial transfer portions. Therefore, since, without the center shaft, the agitating and supplying device can receive the force acting thereon, the agitating and supplying device can be prevented from transforming by the force and from making a noise thereby, as much as possible. Accordingly, there is an improvement in the accuracy of the measurements of the agitating and supplying device and the device shows the stable developer transfer function. Also, since the agitating and supplying device is a molding molded integrally, the whole is almost comprised of a single piece. Thus, the assembly manday is greatly simplified and the production cost of the device greatly decreases. Further, since the plural axial transfer portions are connected with each other to form rings like a spiral. By the arrangement, the efficiency of the transferring the developer in the axial direction can be improved. Further, the axial strains of the agitating and supplying device 1B can be remedied by inserting the center shaft 1A into the center portion thereof. Namely, when each central end surfaces R of the plural axial transfer portions 30, 31, 32, 33 are shifted by the strains thereof, the axial transfer portions contact the outer circumferential surface 11 of the center shaft 1A so as to force the positions thereof to position at regular positions, thus resulting causes to remove. Also, the center shaft 1A can prevent the agitating and supplying device 1B deflecting in the axial direction.

Figure 4:
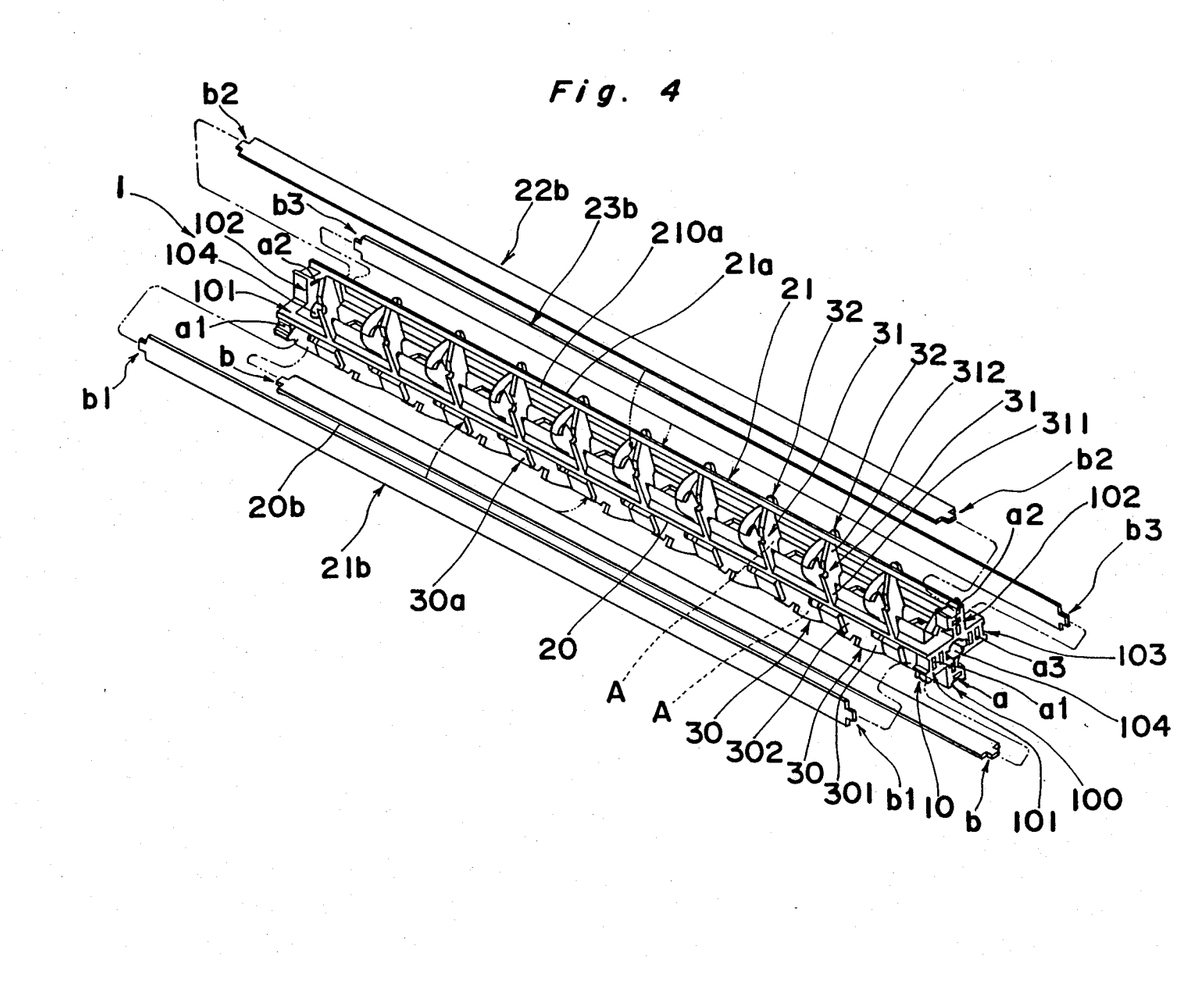
FIG. 4 is a perspective view showing an agitating and supplying device 1B according to another preferred embodiment of the present invention before circumferential members 20b-23b thereof are assembled thereinto.
Figure 5:
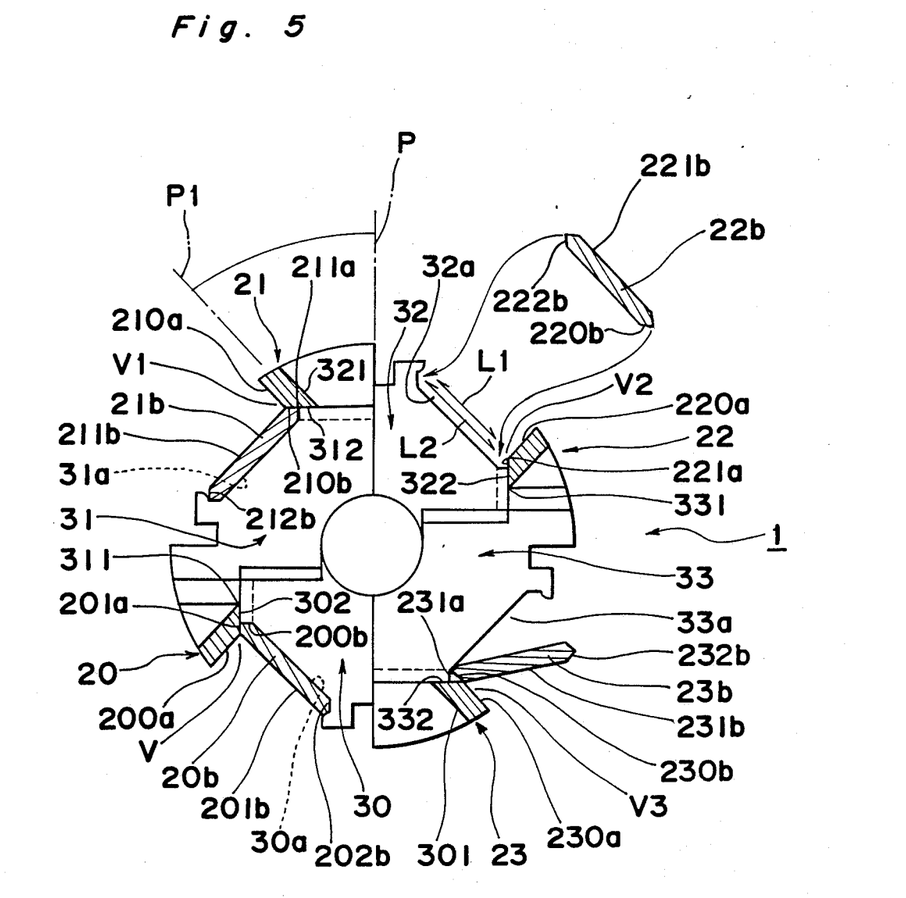
FIG. 5 is a transverse sectional view showing the agitating and supplying device 1B of FIG. 4 while the circumferential members thereof 20b-23b are assembled thereinto.
Figure 6:
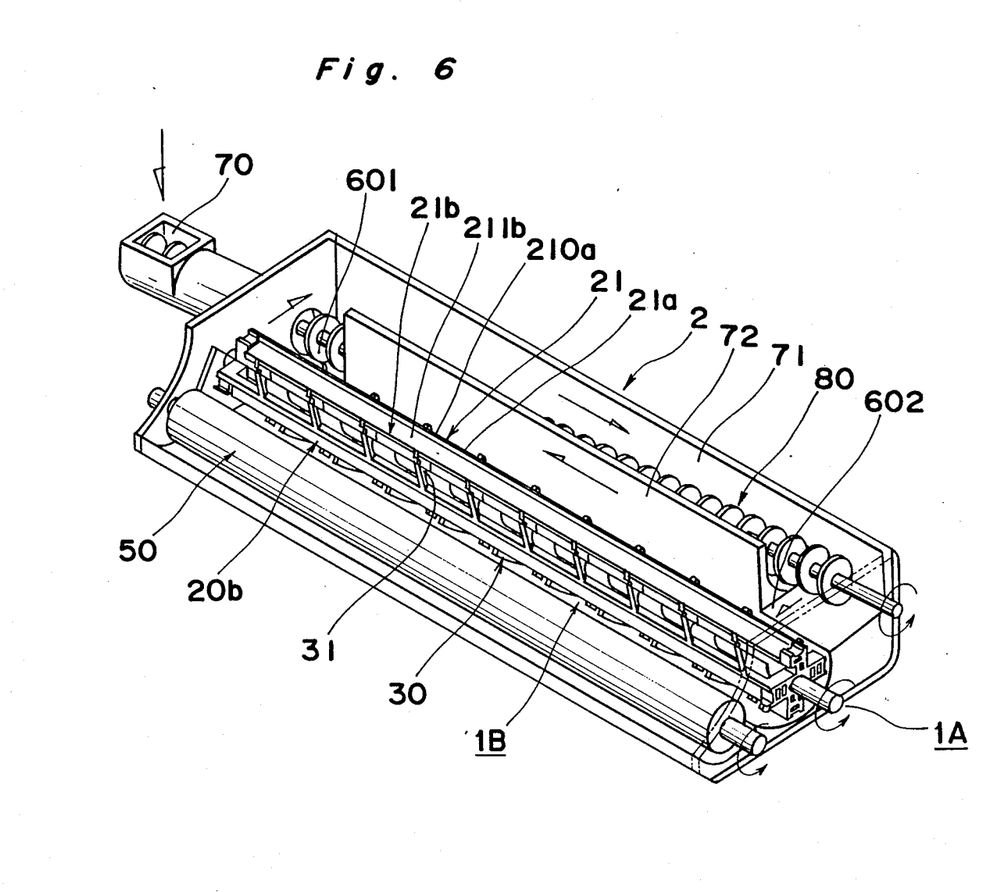
FIG. 6 is a perspective view showing a developing apparatus 2 having the agitating and supplying device 1B of FIG. 4, which is inserted a center shaft 1A into the center portion thereof and which is mounted into a second developer storage tank 72 of the apparatus 2.

FIG. 4 is a perspective view of an agitating and supplying device according to another preferred embodiment of the present invention. FIG. 5 is a transverse sectional view showing the agitating and supplying device of FIG. 4. FIG. 6 is a perspective view showing a developing apparatus having the agitating and supplying device. In the second embodiment of the present invention, the centrifugal transfer portion 20, 21, 22, 23, previously described in the first embodiment, the agitating and supplying device 1B comprises diametral members 20a, 21a, 22a, 23a and circumferential members 20b, 21b, 22b, 23b. Since other constitution of the second embodiment are the almost same as the one of the first embodiment, the reference numerals designating corresponding parts are the same as those in the first embodiment. Then, it is to be noted that the description of the constitution and operation of the second embodiment similar with the first embodiment is omitted.

Each of the circumferential members 20b, 21b, 22b, 23b is a rectangular plate made of synthetic resin by molding and is separated from the diametral member. The pair of the flanges 10, 10 have confronting engaging hollows a, a1 a2, a3 respectively which the ends b, b1, b2, b3 of the circumferential members 20b, 21b, 22b, 23b are engaged with. The circumferential ends of the axial transfer portions 30, 31, 32, 33 have dovetail grooves 30a, 31a, 32a, 33a having the reversed taper inner faces thereof. That is, the bottom of the groove is wider than the opening thereof. One face of each circumferential member 20b, 21b, 22b, 23b serves as a transfer face 201b, 211b, 221b, 231b. The both side ends of each circumferential member 20b, 21b, 22b, 23b have inclined edge faces inclined about 45° respectively.

The diametral members 20a, 21a, 22a, 23a are molded with the flanges 10, 10 and the axial transfer portion 30 so as to form an integral molded piece. Each diametral member 20a, 21a, 22a, 23a has a transfer surface 200a, 210a, 220a, 230a, parallel to the approximate diametral direction of the axis thereof. The circumferential member can be made of material such as metal.

The above-described agitating and supplying device 1B and the four circumferential members 20b, 21b, 22b, 23b are assembled as FIG. 5 shows. This process is described hereinafter. Before the circumferential members 20b, 21b, 22b, 23b are fitted in the dovetail grooves 30a, 31a, 32a, 33a of the axial transfer portions 30, 31, 32, 33 respectively, the both ends b, b1, b2, b3 thereof are adapted for fitting into engaging hollows a, a1, a2, a3 of the pair of flanges 10, 10 respectively. Each end of each circumferential member 20b, 21b, 22b, 23b is attached to each corresponding flange 10. In this state, one long side ends 200b, 210b, 220b, 230b of the circumferential members 20b, 21b, 22b, 23b are inserted into the one sides, near the diametral member 20a, 21a, 22a, 23a, of the dovetail grooves 30a, 31a, 32a, 33a in advance. This process, the circumferential member 23b in FIG. 5 shows this state. Next, the other long side ends 202b, 212b, 222b, 232b of the circumferential members 20b, 21b, 22b, 23b are forced removably into the other sides of the dovetail grooves 30a, 31a, 32a, 33a to take advantageous of the elastic deformations of the circumferential members 20b, 21b, 22b, 23b themselves. According to this process, each circumferential member 20b, 21b, 22b, 23b is fastened to the predetermined dovetail grooves 30a, 31a, 32a, 33a respectively. Groove-shaped transfer spaces V1, V2, V3, V4 each having V-shaped cross-section are formed between each transfer surface 200a, 210a, 220a, 230a approximately parallel to the radial direction of the diametral member 20a, 21a, 22a, 23a, and each transfer surface 201b, 211b, 221b, 231b approximately parallel to the tangent of the circumferential direction of the center axis of the circumferential member 20b, 21b, 22b, 23b. Thus, the circumferential member 20b, 21b, 22b, 23b are assembled on the agitating and supplying device 1B.

According to the second embodiment, since the transfer spaces V1, V2, V3, V4 are formed by each transfer surface 200a, 210a, 220a, 230a of the diametral member 20a, 21a, 22a, 23a, and each transfer surface 201b, 211b, 221b, 231b approximately parallel to the tangent of the circumferential direction of the center axis of the circumferential member 20b, 21b, 22b, 23b, in the rotation of the agitating and supplying device 1B, the agitating and supplying device 1B scoops the developer in the second developer storage tank 72 so that the developer is held in the transfer space V1, V2, V3, V4, and the developer is supplied certainly on the surface of the magnet sleeve roller 50. Therefore, the efficiency of transferring of the developer in the center axial direction can be improved. Also, since each circumferential member 20b, 21b, 22b, 23b is fastened to the dovetail grooves 30a, 31a, 32a, 33a, each circumferential member 20b, 21b, 22b, 23b is fixed so as to simply and hold simply and certainly to the agitating and supplying device 1B, and in the rotation of the circumferential member 20b, 21b, 22b, 23b with the agitating and supplying device 1B, the inconvenience as in the conventional arrangement such as movements of rising the circumferential member 20b, 21b, 22b, 23b from the surface of the agitating and supplying device or separating them from the agitating and supplying device by centrifugal force actuated them or resistance occurred in agitating and transferring the developer and the like, can be advantageously prevented. The agitating and supplying device 1B is comprised of an integral molded piece comprising the pair of flanges 10, 10, the four diametral members 20a, 21a, 22a, 23a, and the plural axial transfer portion 30, 31, 32, 33. Therefore, the dimensional accuracy of the agitating and supplying device can be improved and the device shows stably the developer agitating and transferring function. Further, each flange has engaging holes for engaging with each end of the circumferential member at the confronting face of the flange. Both ends of each circumferential member are engaged with each hole. By the arrangement, when each circumferential member positions on the other members, the positioning thereof can be simplified.

The above-described integral molded piece of the agitating and supplying device is molded by the following mold.

Figure 7:
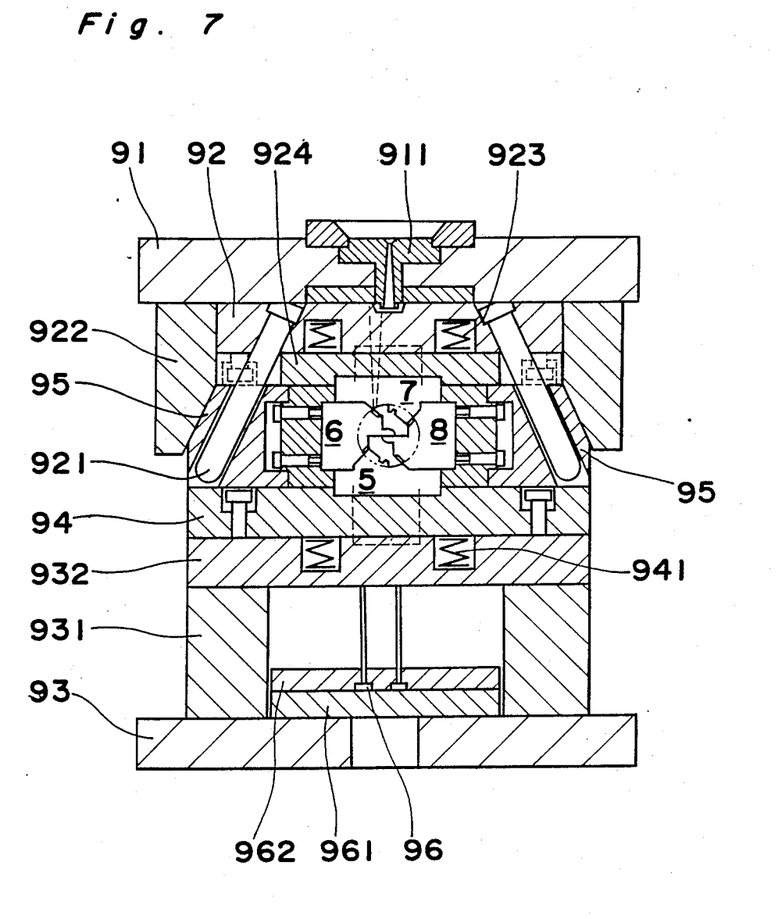
FIG. 7 is a sectional view of a pressure device and a mold of third embodiment while the mold is mounted on the device in mold clamping state.
Figure 8:
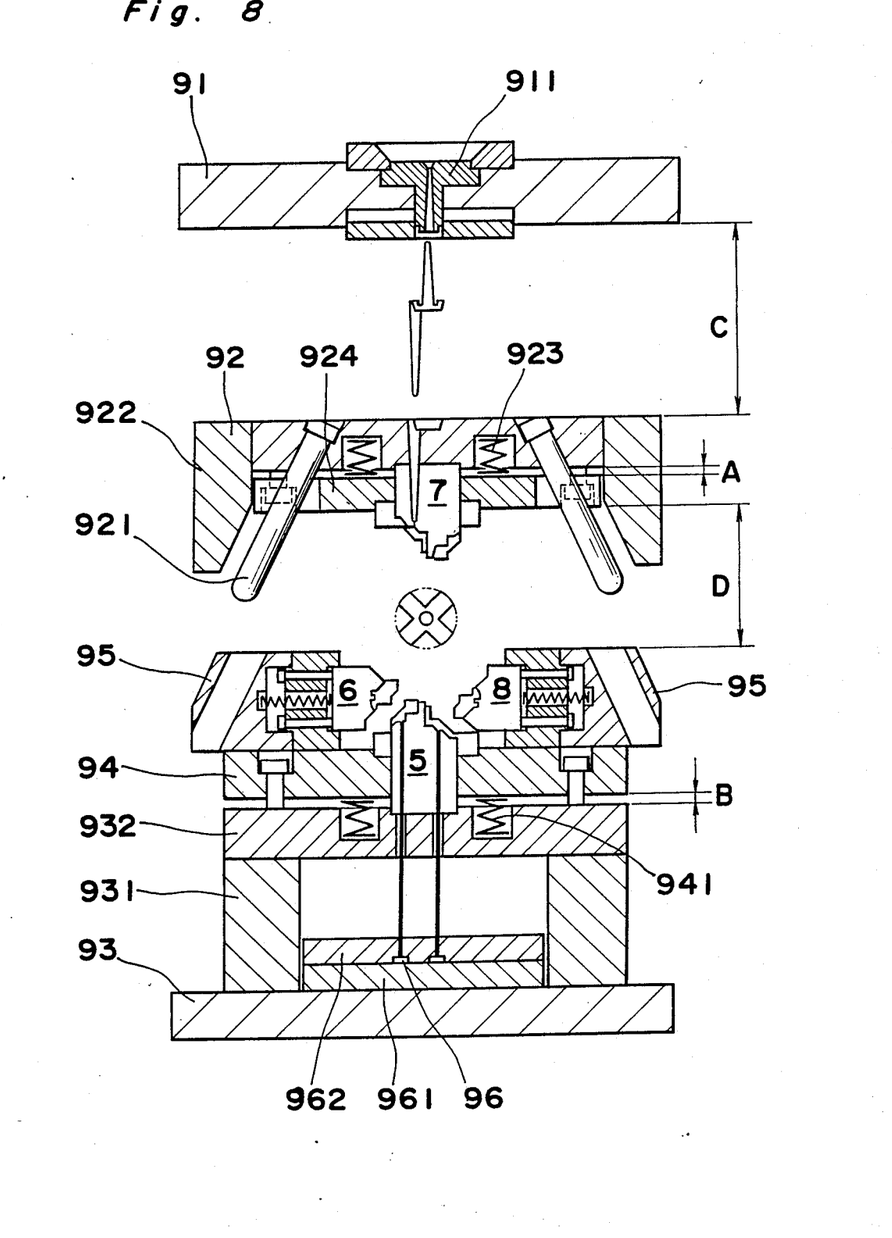
FIG. 8 is a sectional view showing the pressure device and the mold in mold opening state.

The mold according to this third embodiment relates to mold for molding the agitating and supplying device. FIG. 7 is a transverse sectional view of the mold, according to third preferred embodiment of the present invention, mounting in a pressure device of a molding press equipment and the pressure device in mold clamping state. FIG. 8 is a transverse sectional view showing the mold and the pressure device in mold opening state. The pressure device comprises a retainer plate 91 having a sprue bush 911, a lower retainer plate 92, which an angular pin 921 and a locking block 922 are fixed to, holding an upper retainer plate 924 forced downwardly by spring force of a spring 923, a bottom plate 93 supporting a backing plate 932 through a spacer block 931, a movable retainer plate 94 held by the backing plate 932 so as to be forced upwardly by spring force of a spring 941, a pair of slides 95 held slidably on the movable retainer plate 94 so as to be clamped by the locking block 922 and to be driven by the angular pin 921, and an ejector pin 96 fixed on an upper ejector plate 961 and a lower ejector plate 962. The mold according to the embodiment is comprised of a first main mold member 5, a second main mold member 6, a third main mold member 7, a fourth main mold member 8, and a pair of side mold members (not shown). The side mold members are positioned to the both ends of the four main mold members 5, 6, 7, 8 so as to mold the flanges 10, 10 of the agitating and supplying device. It is to be noted that since each side mold member is the same kind of a conventional parting mold, the description of the side mold members is omitted here.

The first main mold member 5, the second main mold member 6, the third main mold member 7 and the fourth main mold member 8 which the mold is comprised of are arranged as described hereinafter. The basic portion of the first main mold member 5 is fixed on the movable retainer plate 94. The basic portion of the second main mold member 6 is fixed on one of the slides 95. The basic portion of the third main mold member 7 is fixed on the upper retainer plate 924. The basic portion of the fourth main mold member 8 is fixed on the other slide 95. Then, each main mold member is arranged in the pressure device so as to move relatively in the diametral direction of the center of the mold.

Figures 9, 10:
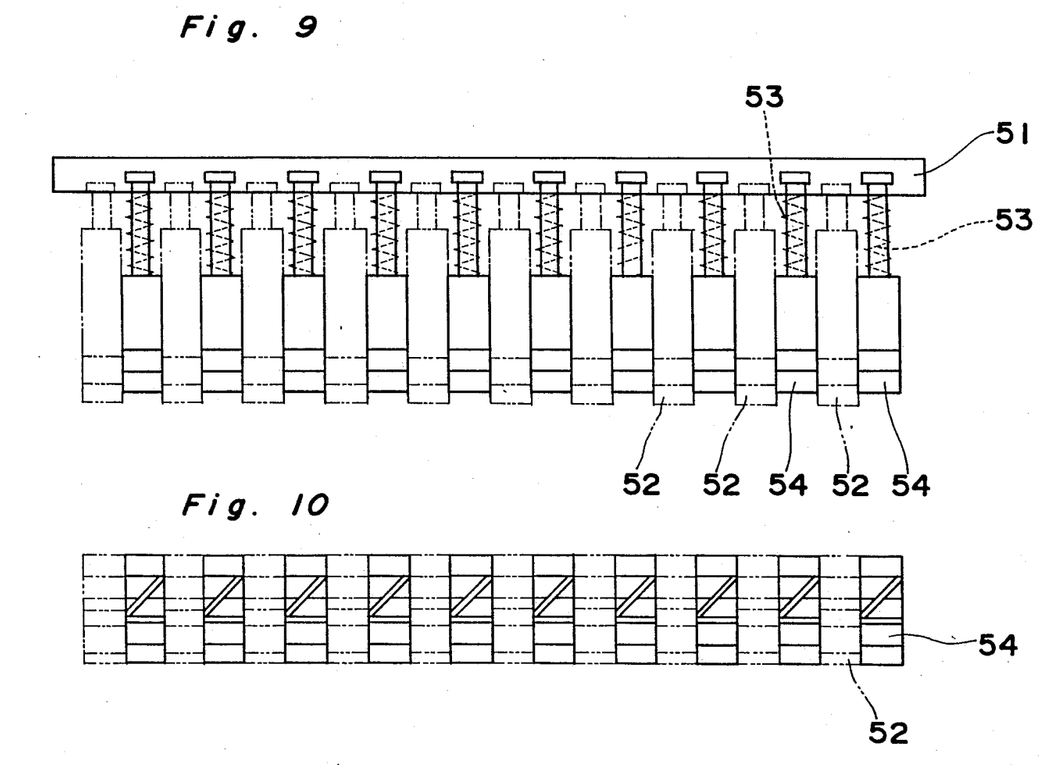
FIG. 9 is a side view of a main mold member of a mold of third embodiment.
FIG. 10 is a plan view of the main mold member.
Figure 11:
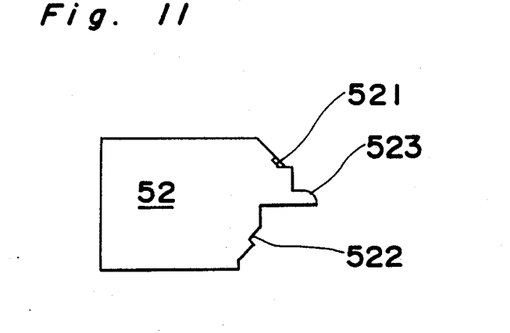
FIG. 11 is a side view of an intermediate mold member of the mold of third embodiment.
Figure 12:
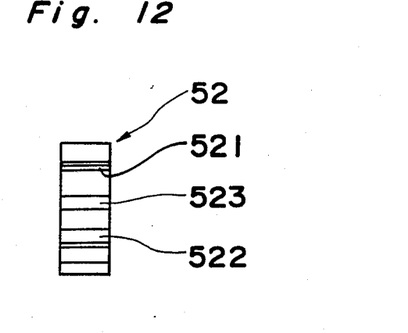
FIG. 12 is a plan view of the intermediate mold member.
Figure 13:
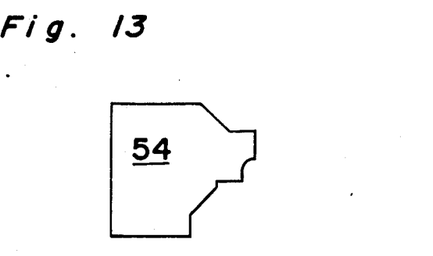
FIG. 13 is a side view of an blade mold member of the mold of third embodiment.
Figure 14:
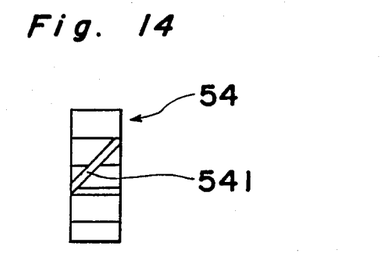
FIG. 14 is a plan view of the blade mold member.

Each of the first main mold member 5 and the third main mold member 7 is comprised of a base 51 as shown in FIG. 9 and 10, ten intermediate mold members 52 fixed on the base 51, and ten blade mold member 54 arranged between the adjacent intermediate mold members 52 so as to be forced toward the end thereof by bias force of a spring 53 serving as a second spring. The intermediate mold member 52 is the same thickness with the blade mold members 54. The difference between the composition of the second main mold member 6 and the fourth main mold member 8, and the one of the first main mold member 5 and the third main mold member 7 is mainly the point of that the relative positions of the intermediate mold member 52 and the blade mold member 54 are reversed. Each mold face, forming a cavity, of the main mold members has the same shape with each other. Each intermediate mold member 52 is arranged between the adjacent blade mold members in the axial direction thereof and has the same or similar shape of the side face thereof as shown in FIG. 11 and the same shape of the end face thereof as shown in FIG. 12. The faces, indicated by numerals 521 and 522, of the end faces of the intermediate mold member 52 are formed the mold faces for molding the centrifugal transfer portion 20 of the agitating and supplying device. The face, indicated by numeral 523, is the mold face for molding the center end face R of the axial transfer portion 30. Each blade mold member 54 has the same or similar shape of the side face thereof as shown in FIG. 13 and the same shape of the end face thereof as shown in FIG. 14. The groove, indicated by numeral 541, of the end face of the blade mold member 54 is formed the cavity for molding the axial transfer portion 30 of the agitating and supplying device.

Figure 15:
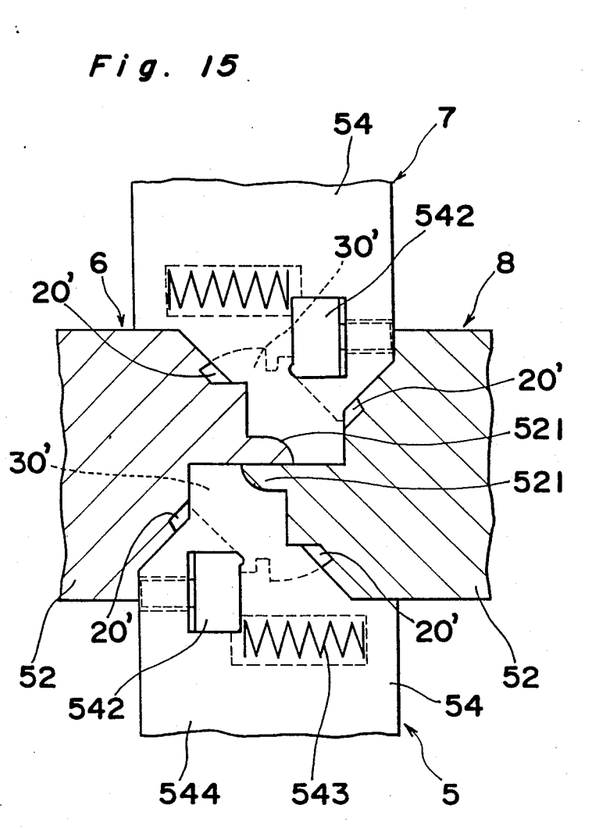
FIG. 15 is an enlarged sectional view showing the arrangement of the main mold member of the mold of the third embodiment in mold clamping state.
Figure 16:
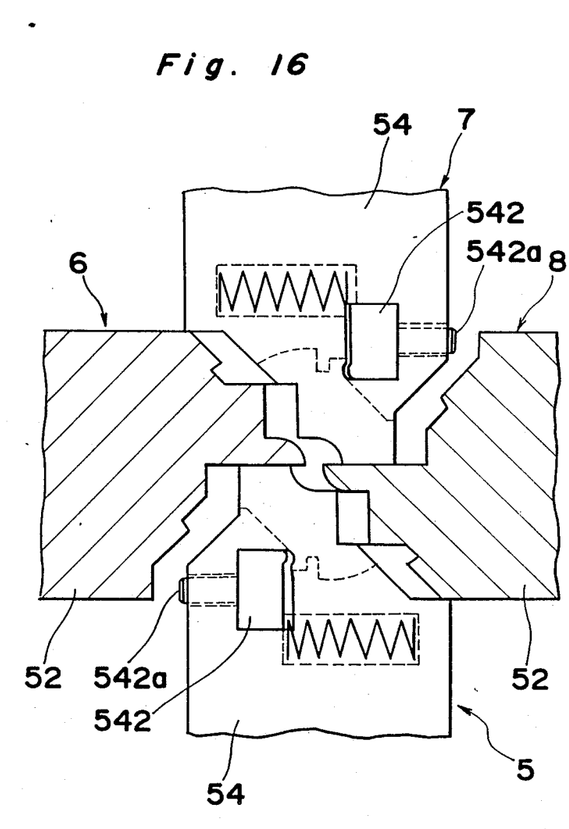
FIG. 16 is an enlarged sectional view showing the arrangement of the main mold member in partial mold opening state.

Next, FIG. 15 is an enlarged transverse sectional view of each main mold member while the end portions of each member are clamped. FIG. 16 is an enlarged transverse sectional view of each main mold member while the end portions of each member are opened slightly. In FIG. 15 and 16, each side face of the blade mold members 54 of the first main mold member 5 and the third main mold member 7 is bared. The same blade mold member of the third main mold member 7 is indicated by the same numeral 54. In the same figures, each sectional view of the intermediate mold members 52 of the second main mold member 6 and the fourth main mold member 8 is shown. The intermediate mold member of every main mold member is indicated by the same numeral 52. As clearly seen from these figures, it is to be noted that the first main mold member 5 and the third main mold member 7 are symmetric with respect to an axis at each other and that the second main mold member 6 and the fourth main mold member 8 are symmetric with respect to an axis at each other.

Each end 521 of the intermediate mold members 52 contacts with each other so as to form the center hole for making the center shaft penetrate. Although the both intermediate mold members of the second main mold member 6 and the fourth main mold member 8 are not shown in those figures, if those members are illustrated, the figures illustrated the members are FIG. 15 and 16 rotated 90 degrees. Each end of the intermediate mold members of the second main mold member 6 and the fourth main mold member 8 contacts with each other so as to form the continuous center hole for making the shaft penetrate.

Figure 17:
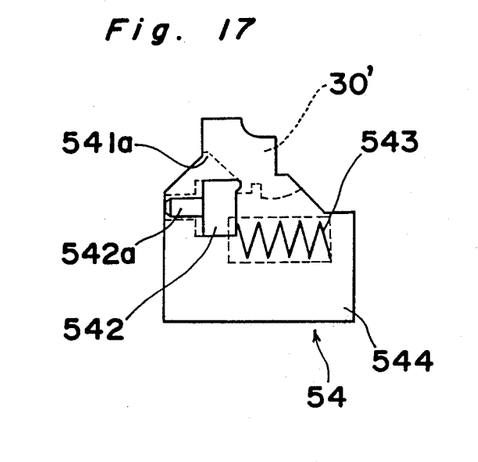
FIG. 17 is a side view of the blade mold member of the mold of third embodiment.
Figure 18:
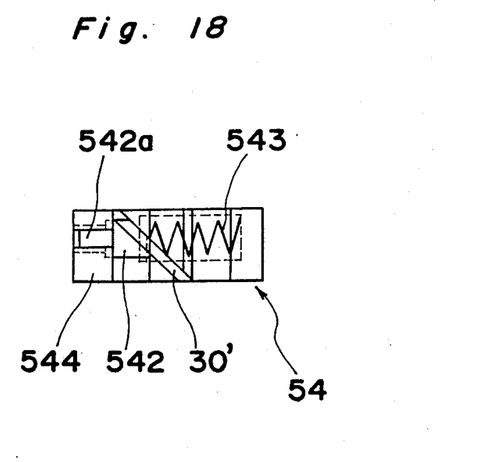
FIG. 18 is a plan view of the blade mold member.

The blade mold member 54 consists of a blade mold body 544, an insert die 542, and a bias spring 543 serving as a first spring. FIG. 17 is a side view of the blade mold member. FIG. 18 is a plan view of the member. FIG. 17 and 18 show the blade mold member 54 while the insert die 542 thereof is clamped against the bias force of the spring 543. Each of the blade mold members 54 is arranged approximately parallel to the axial direction thereof and is a member for forming mainly a cavity 30' for molding the outer circumferential end face and the both side faces of each axial transfer portion 30, 31, 32, 33 (shown in FIG. 2) at the blade mold body 544. The cavity of the mold face of the blade mold member 54 extends in a direction inclined toward the center axis thereof.

Then, the cavity of the blade mold member continues the cavity of the adjacent blade mold member in the circumferential direction thereof so as to mold the plural axial transfer portions and to form spirals extending in the center axis thereof.

The insert die 542 is used for molding one of undercuts 42 of the engaging groove 30a, 31a, 32a, 33a of the axial transfer portion 30, 31, 32, 33. The other undercut 41 of the engaging grooves 30a, 31a, 32a, 33a are molded by the portions, indicated by the numeral 546, of the blade mold body 544. Each insert die 542 is held movably in the circumferential direction, corresponding to the leftward in FIG. 17 and 18, of the blade mold body 544 thereby. By the bias force of the spring 543, the end pin 542a of the insert die 542 are projected from the side wall of the blade mold body 544 and makes the undercut 42 open. FIG. 16 shows that state. In clamping state, the end pin 542a contacts the side wall of the intermediate mold member 52 of the other main mold member clockwise adjacent thereto to be clamped as shown in FIG. 16.

The plural intermediate mold members and the plural blade mold members which one main mold member comprises of can be integrally formed, respectively. Conversely, the plural intermediate mold members and the plural blade mold members can be independently formed, respectively. For instance, it is possible that the intermediate mold members are fixed on one basic portion at a specified intervals and the blade mold members are held slidably between the intermediate mold members. The member for pressing the insert die toward the blade mold body in mold clamping can be used the intermediate mold member adjacent to the blade mold member or the other main mold member adjacent to the main mold member having this blade mold member. Each thickness and each number of the blase mold members and the intermediate mold members are determined according to the required number of the axial transfer portions and others.

In seen from FIG. 15, the cavity of the mold comprises the cavity portion 20' for molding the centrifugal transfer portion 20, 21, 22, 23 and the cavity portion 30' for molding the axial transfer portion 30, 31, 32, 33.

The construction of this embodiment according to the present invention is described above. Next, the function of the embodiment is described hereinafter.

The basic portion of the first main mold member 5 is fixed on the movable retainer plate 94. The basic portion of the second main mold member 6 is fixed on one of the slides 95. The basic portion of the third main mold member 7 is fixed on the upper retainer plate 924. The basic portion of the fourth main mold member 8 is fixed on the other slide 95. FIG. 8 shows this state. In FIG. 8, the mold is opened and each blade mold member 54 projects in the axial direction from the intermediate mold member 52 by the bias force of the spring 53. The pin 542a of each insert die 542 projects from the blade mold body 541 by the bias force of the spring 543. Next, the mold is clamped by the pressure device. The bottom plate 93, supporting the backing plate 932 by the spacer block 931, moving upward in FIG. 8 clamps the mold. By the upward movement of the bottom plate 93, the pair of slides 95, 95 moves upward with the movable retainer plate 94. Then, the pair of slides 95, 95 come close to each other while being guided by the angular pin 921 and the locking block 922. Thus, the movable retainer plate 94, the pair of slides 95, 95, and each main mold member 5, 6, 7, 8 fixed on the upper retainer plate 924 come close to each other. As shown in FIG. 16, the blade mold body 544 of each blade mold member 54 reaches a specified clamping position. Next, by upward movement of the movable retainer plate 94, each intermediate mold member 52 comes close to each other against the bias force of the spring 53. At the same time, the intermediate member 52 adjacent to the insert die 542 in the circumferential direction presses the insert die 542 against the bias force of the spring 543, thus the insert die 542 moves to the clamping position. Finally, the members are clamped as shown in FIG. 7 and 15. Thus, the cavities of the mold are formed.

In this state, fluid resin is injected through the sprue hole of the sprue bush 911 into the cavities of the mold. After that, the fluid resin is reacted or cooled to be set and to be molded.

Next, the lower retainer plate 92 moves downward as the pressure device moves in reverse. Accordingly, each main mold member is driven in a direction in which they separated to each other in up-and-down and right-and-left. In this early mold opening operation, since the bias force of the spring 53 acts on the blade mold body 544 of the blade mold member 54 toward the clamping position, the body 544 is not opened, but the intermediate mold member 52 is opened. According to this operation, the insert die 542 pressed by the intermediate mold member 52 is opened by the bias force of the spring 543. FIG. 16 shows this state. Then, the molded undercut is separated from the insert die. After the mold opening operation proceeds further, both the intermediate mold member 52 and the blade mold member 54 are opened, finally, a molding is ejected from the mold by the ejector pins 96 as shown in FIG. 8.

By the above operation, the agitating and supplying device shown in FIG. 1 is molded. The material for injecting into the mold can be used mainly synthetic resin. The material can be used specially ceramic material, aluminum alloy, zinc alloy, or other materials.

According to the mold of the embodiment, the plural main mold members comprise the plural blade mold members and the plural intermediate mold members, arranged alternately. Each of the blade mold members comprises the blade mold body and the insert die. By the insert die, one of the undercuts is molded. Before the blade mold bodies are opened, the insert dies are opened. Thus, the blade mold bodies are opened to prevent the bodies from contacting the undercuts of the molding. By the arrangement of the embodiment, the agitating and supplying device having four engaging grooves at the outer circumferential portions thereof can be molded. Since the agitating and supplying device is a molding molded integrally, the whole is almost comprised of a single piece. Thus, the assembly manday is greatly simplified and the production cost of the device greatly decreases.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An agitating and supplying device for being rotated around a central rotary axis in a developing apparatus for transferring a developer in the direction of the central rotary axis while agitating the developer and for supplying the developer onto a developer roller in a direction radially of the central rotary axis, said device comprising:

a pair of end supports spaced in the direction of the central rotary axis and having shaft receiving holes therein along the central rotary axis and adapted to receive a rotary shaft therein and further having an outer periphery;

a plurality of straight elongated first supplying members for supplying the developer onto the surface of the developer roller and positioned at circumferentially spaced positions around the central rotary axis and each having one end fixedly connected to the outer periphery of one of said end supports and having the other end fixedly connected to the outer periphery of the other end support, said first supplying members having substantially radially extending surfaces; and a plurality of second supplying members for transferring the developer in the direction parallel to the central rotary axis, each of said second supplying members having a transfer surface extending in a direction around the central rotary axis generally spirally inclined to the central rotary axis, each second supplying member being connected at one end of the transfer suface thereof to one of said first supplying members adjacent thereto and the second supplying member being connected at the other end of the transfer surface to another of said first supplying members adjacent thereto, successive second supplying members being generally spirally aligned with the preceding and succeeding second supplying members in the succession for extending generally in a spiral around the central rotary axis the connections to said first supplying members being the connections for supporting said second supplying members in said device.

2. A device as claimed in claim 1 in which each second supplying member has an inner end positioned with respect to the inner ends of the other second supplying members for forming a space aligned with said shaft receiving holes in said end supports, whereby when a shaft is inserted into said device through said shaft receiving holes, the inner ends of said second supplying members rest on the shaft without being attached thereto.

3. A device as claimed in claim 1 in which said transfer surfaces of said second supplying members are flat planar surfaces, and said second supplying members are further connected at one end thereof in the direction around the central rotary axis with the next successive second supplying member with the planes of the respective transfer surfaces angularly offset to form a discontinuity in the transfer surfaces of the successive second supplying members.

4. A device as claimed in claim 1 in which said first supplying members extend substantially parallel with said rotary central axis.

5. A device as claimed in claim 1 in which said first supplying members and said second supplying members are substantially symmetrically positioned with respect to said rotary central axis.

6. A device as claimed in claim 1 in which said second supplying members have outer peripheral edges, and each of said first supplying members comprises a diametral member having a surface extending substantially radially of said device and constituting said radially extending surface, and which is the part of said first supplying member to which said second supplying members are connected, and a circumferential member having a transfer surface substantially parallel to a tangent to a circumferential direction around said central rotary axis and being detachably mounted on said outer peripheral edges of the second supplying members at intervals along said device parallel to said central rotary axis.

7. A device as claimed in claim 6 in which the outer peripheral edge of each second supplying member has a dovetail groove therein extending parallel to said central rotary axis for receiving a circumferential member therein.

8. A device as claimed in claim 6 in which each of said end supports has recesses therein and said circumferential members have ends which are removably engaged in said recesses for holding the ends of said circumferential members.

* * * * *